US006635828B2

(12) United States Patent
Lepley et al.

(10) Patent No.: US 6,635,828 B2
(45) Date of Patent: Oct. 21, 2003

(54) COMPOSITE ELECTRICAL INSULATOR INCLUDING AN INTEGRATED OPTICAL FIBER SENSOR

(75) Inventors: Damien Lepley, Vichy (FR); Alain Mure-Ravaud, La Tour de Salvagny (FR); Alain Trouillet, Saint Geuest Malifaux (FR)

(73) Assignee: Sediver Societe Europeenne d'Isolateurs en Verre et Composite, Nanterre (FR)

( * ) Notice: Subject to any disclaimer, the term of this patent is extended or adjusted under 35 U.S.C. 154(b) by 0 days.

(21) Appl. No.: 10/152,666

(22) Filed: May 21, 2002

(65) Prior Publication Data

US 2002/0175001 A1 Nov. 28, 2002

(30) Foreign Application Priority Data

May 22, 2001 (FR) .......................................... 01 06 702

(51) Int. Cl.[7] .............................. G02B 6/44; H04B 9/00
(52) U.S. Cl. .......................... 174/139; 385/12; 385/101
(58) Field of Search ........................... 174/139; 385/12, 385/101

(56) References Cited

U.S. PATENT DOCUMENTS 4,610,033 A * 9/1986 Fox, Jr. ...................... 174/139
4,613,727 A * 9/1986 Salanki et al. ............. 174/139
4,703,175 A * 10/1987 Salour et al. ................. 356/45
4,802,731 A * 2/1989 Maschek et al. ............ 385/101
4,919,217 A * 4/1990 Mima et al. ................ 174/139
5,012,182 A * 4/1991 Fujiki et al. ................ 174/139
5,090,793 A * 2/1992 Seike et al. ................. 174/139
5,138,692 A * 8/1992 Ikeda et al. ................. 174/139
5,339,381 A * 8/1994 Ikeda et al. ................. 174/139
6,215,940 B1 * 4/2001 Johnson ...................... 385/101
6,243,506 B1 * 6/2001 Wu et al. ..................... 385/12
6,449,400 B1 * 9/2002 Watanabe et al. ............. 385/12

FOREIGN PATENT DOCUMENTS

FR 2687830 8/1993

OTHER PUBLICATIONS

Patent Abstracts of Japan, vol. 018, No. 017 (E–1488), Jan. 12, 1994 & JP 05 258629.
A (NGK Insulators Ltd) Oct. 8, 1993.
Patent Abstracts of Japan, vol. 013, No. 513 (E–847), Nov. 16, 1989 & JP 01 209609.
A (NGK Insulators Ltd) Aug. 23, 1989.

* cited by examiner

*Primary Examiner*—Dean A. Reichard
*Assistant Examiner*—Adolfo Nino
(74) *Attorney, Agent, or Firm*—Ware, Fressola, Van Der Sluys & Adolphson LLP

(57) ABSTRACT

The composite electrical insulator comprises an integrated optical fiber sensor placed inside the insulator. The integrated sensor can be a fault sensor constituted by an optical fiber placed on the support rod of the insulator and having optical cladding that melts at a temperature which is critical for the insulator. The integrated sensor can be a sensor for measuring stresses of mechanical or thermal origin acting on the insulator while it is in operation. It is constituted by an optical fiber having a Bragg grating implanted therein. The Bragg grating is placed on the support rod of the insulator or on a metal end-fitting of the insulator.

7 Claims, 1 Drawing Sheet

COMPOSITE ELECTRICAL INSULATOR INCLUDING AN INTEGRATED OPTICAL FIBER SENSOR

CROSS-REFERENCE TO RELATED APPLICATIONS

Priority is claimed from French patent application no. 01 06702 filed May 22, 2001.

The present invention relates to an electrical insulator for medium or high voltage, of composite structure, and in particular an insulator for a substation or an electricity line.

BACKGROUND OF THE INVENTION

As is well known, medium or high voltage electrical insulators are subjected to various stresses, in particular stresses of electrical, mechanical, or thermal origin. If, for whatever reason, these stresses become too high, they run the risk of causing the insulator to fail. It is possible, by visual inspection, to detect and locate insulators that are no longer in good condition when said insulators are built up of quenched glass insulator elements, since under such circumstances the slightest defect gives rise to the faulty insulator element shattering. In contrast, with a composite electrical insulator, a defect can develop without being apparent, for example if it occurs beneath the elastomer covering of the composite insulator. This can continue until the moment when, after a runaway, the insulator is no longer capable of performing its dielectric support function. Such a fault can take the form of an electrical discharge which starts close to one of the metal end-fittings of the insulator and which moves slowly along the support rod of the insulator underneath the insulating covering. This gives rise to slow combustion of the support rod of the insulator, thereby changing the mechanical and dielectric characteristics of the insulator.

OBJECT AND SUMMARY OF THE INVENTION

The object of the invention is to propose a solution for remedying the above-mentioned drawbacks of composite electrical insulators.

To this end, the invention provides a composite electrical insulator including an optical fiber sensor integrated therein, located inside the insulator. Optical fibers are already used in substation composite insulators for conveying data from one end of the insulator to the other. The invention is based on the fact that an optical fiber can also be used to constitute an integrated sensor for sensing an insulator fault. More particularly, an optical fiber is wound helically on the support rod of the insulator and is in close contact therewith. By selecting an optical fiber having a silica core and optical cladding that melts at a critical temperature, generally below 200° C., e.g. optical cladding made of a hard polymer, the beginning of electrical discharges travelling along the support rod of the insulator will cause the temperature of the optical fiber to exceed 250° C. locally, thereby causing the optical cladding of the fiber to melt locally and thus damaging the fiber irreversibly. The localized damage to the optical fiber has the effect of attenuating light signals guided in the fiber. A change in the transmission characteristics of the optical fiber can be observed at a measurement unit connected to one end of the fiber to receive the attenuated light signals. The integrated optical fiber fault sensor of the invention can be an optical fiber as mentioned above and that has one of its ends placed inside the insulator and treated so as to act as a reflector, the other end of the fiber being guided outside the insulator for connection to the measurement unit.

In another aspect of the invention, the integrated optical sensor can be a sensor for measuring stresses of mechanical origin, and/or a sensor for measuring stresses of thermal origin acting on the insulator, in particular while it is in service. More precisely, a Bragg grating written in the optical fiber can be used to measure deformation of the support rod of the insulator or indeed to measure temperature levels inside the insulator.

To measure deformation, a Bragg grating is written in a portion of the optical fiber where the protective sheaths have been removed down to the optical cladding. This portion of the fiber which has the Bragg grating written therein is several centimeters long and it is stuck to the support of the insulator, e.g. in such a manner as to extend along the longitudinal axis of the support rod of the insulator so as to be sensitive to longitudinal deformation thereof. The end of the fiber that is guided to the outside of the insulator is connected to a measurement unit suitable for detecting a shift in a spectrum line as reflected by the Bragg grating under the influence of the mechanical stress acting on the insulator. This shift in the spectrum line reflected by the Bragg grating also occurs under the influence of temperature. Adding a second grating along the same optical fiber and subjected to the same temperature variations but not to the same mechanical stresses makes it possible to account for the influence of temperature on the first Bragg grating. It can be preferable for the two Bragg gratings to be centered on different wavelengths so as to ensure that there is no interference between the measurements performed on the two gratings respectively.

If the Bragg grating is used to measure temperature it is written in an end portion of a fiber in close contact with a metal end-fitting of the insulator, e.g. the end-fitting at the high voltage end of the insulator, and it can be used to perform continuous monitoring to ensure that the end-fitting does not heat to a temperature higher than a limit value at which the insulator runs the risk of being damaged. The use of an integrated optical fiber temperature sensor in a composite line electrical insulator of the invention makes it possible, advantageously, to improve the line management facilities of an electricity grid since the sensor can inform the electricity distributor whether or not it is possible to increase the amount of electricity being conveyed without damaging the insulators. Naturally, and without going beyond the ambit of the invention, the Bragg grating could be replaced by some other type of member for measuring stresses of mechanical, thermal, or other origin, intrinsically or extrinsically relative to the optical fiber, but integrated in the insulator.

BRIEF DESCRIPTION OF THE DRAWING

The invention, and its characteristics and advantages are described in greater detail in the following description with reference to the figures mentioned below.

MORE DETAILED DESCRIPTION

Figure 1:
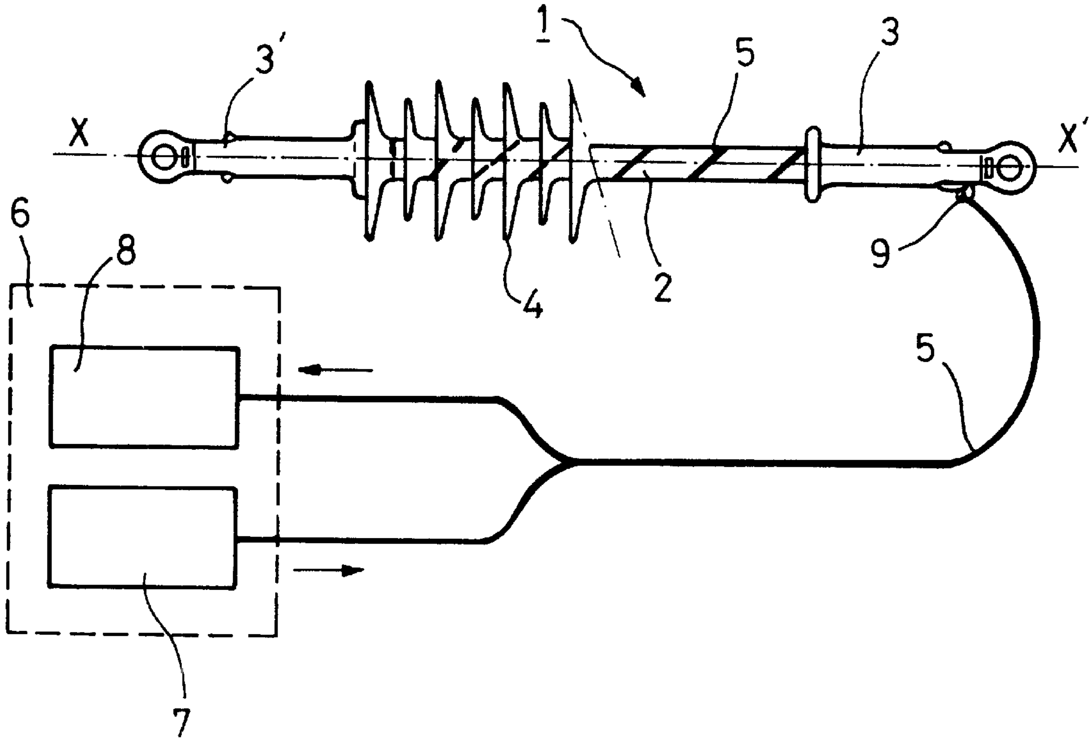
FIG. 1 is a diagrammatic view of a composite insulator of the invention fitted with an integrated optical fiber defect sensor. In this figure, a portion of the covering surrounding the support has been removed to reveal the optical fiber placed inside the insulator.

The composite electrical insulator 1 shown by way of example in FIG. 1 is a line insulator for mounting on a pylon to support a high voltage line. It comprises a rigid insulating support rod 2 forming a solid pole, with its two ends inserted in two respective hollow metal end-fittings 3, 3'. These metal end-fittings 3, 3' are fixed to the ends of the support rod 2 in conventional manner by crimping or by adhesive or indeed by adhesive and shrink-fitting. The support rod 2 is made of a conventional epoxy resin and glass fiber composite. The invention also applies to a composite insulator for a substation comprising a support rod 2 of tubular shape adapted to constitute a ground support leg for electrical apparatus such as a high voltage/medium voltage transformer.

The support rod 2 is surrounded between its two ends by a covering 4 of dielectric material (generally an elastomer) molded or extruded onto the support rod 2. The outside surface of the covering 4 has a series of disk-shaped fins or "sheds" formed thereon and centered on the longitudinal axis XX' of the support, in conventional manner.

The insulator 1 in FIG. 1 includes an integrated optical fiber sensor 5 acting as a fault sensor. The optical fiber 5 is a fiber having a silica core and optical cladding made of a hard polymer whose melting point is generally below 200° C. In this case, the fiber 5 has one end treated to act as a reflector, this end being placed on the support rod 2 close to or inside the end-fitting 3' situated at the line end of the insulator. The optical fiber 5 is wound helically on the support rod 2 in close contact therewith and as far as the other end-fitting 3. The turns of the fiber 5 are located beneath the covering 4. The treated end is located beneath the covering 4 or inside the end-fitting 3'. The assembly is thus inside the insulator 1. The other end of the fiber 5 is guided to the outside of the insulator through the end-fitting 3 (normally situated at its grounded end) for connection to a measurement unit 6. The fiber 5 is preferably stuck to the support rod 2 using the same epoxy resin mixture as is used in the composite from which the rod is made. If electrical discharges begin at the end-fitting 3' and progress along the support rod 2 towards the other end-fitting 3, they give rise to local damage to the optical cladding of the fiber as they progress along the support rod 2. The measurement unit 6 has a source 7 of light signals and an analyzer 8 suitable for detecting variations (attenuation phenomenon) in the signals carried by the fiber 5 from the source 7 and reflected by the treated end of the optical fiber. The fault in the insulator can thus be detected before the insulator has become completely incapable of performing its dielectric support function since this type of fault progresses slowly in time. The measurement unit 6 can be placed at a distance from the insulator, for example on the ground, and the connection between the optical fiber 5 and the measurement unit 6 can be implemented via an optical connector 9 which can be integrated in the end-fitting 3 that is normally situated at the grounded end of the insulator, as shown in FIG. 1.

Figure 2:
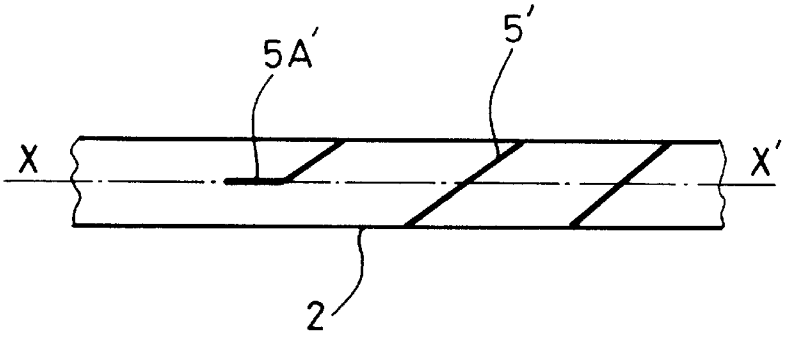
FIG. 2 shows a portion of an optical fiber that includes a Bragg grating forming an integrated sensor for measuring stresses of mechanical origin.

In FIG. 2, an optical fiber 5' serves as an integrated sensor for measuring stresses of mechanical origin. As can be seen in this figure, a portion 5A' of the fiber 5', in this case an end portion of the optical fiber, is placed in close contact with the outer surface of the support rod 2 so as to extend along the longitudinal axis XX' of the support rod. This end portion 5A' is preferably placed well away from both of the end-fittings 3, 3' so as to be sensitive to longitudinal deformation of the support rod 2. This end portion 5A' is a portion that has been stripped down to the optical cladding of the optical fiber 5' where a Bragg grating has been written in the fiber. The remainder of the optical fiber 5' is laid helically, for example, around the support rod 2 going to the end-fitting 3 through which it extends for connection to the measurement unit. Instead of being wound helically, the fiber 5' could equally well be placed longitudinally along the axis XX' in order to extend beyond the insulator. The end portion 5A' in which the Bragg grating is written is preferably held in close contact with the support rod by adhesive using epoxy resin as described above. In the example shown in FIG. 2, the source 7 of the measurement unit 6 sends light signals into the fiber 5' whose Bragg grating reflects a spectrum line corresponding to a defined wavelength $\lambda_b$ which returns to an analyzer 8 of the measurement unit 6. The analyzer 8 serves to pick up the signal of wavelength $\lambda_b$ as reflected by the Bragg grating along the fiber. If the Bragg grating is subjected to mechanical stress, the wavelength of the spectrum line reflected thereby is modified and this can be detected by the analyzer 8. The optical fiber 5' thus makes it possible to measure deformation of the support 2 due to stresses of a mechanical origin acting on the insulator 1, and to do so on a continuous basis. A second Bragg grating (not shown in FIG. 2) can be located close to the first Bragg grating on the same optical fiber 5' so as to be sensitive solely to the thermal stresses acting on the first Bragg grating without being subjected to any deformation of the support rod. This second Bragg grating makes it possible to quantify the temperature drift in the measurements performed on the first Bragg grating. The second Bragg grating can be placed at an end of the fiber behind the first Bragg grating as seen from the measurement unit.

Figure 3:
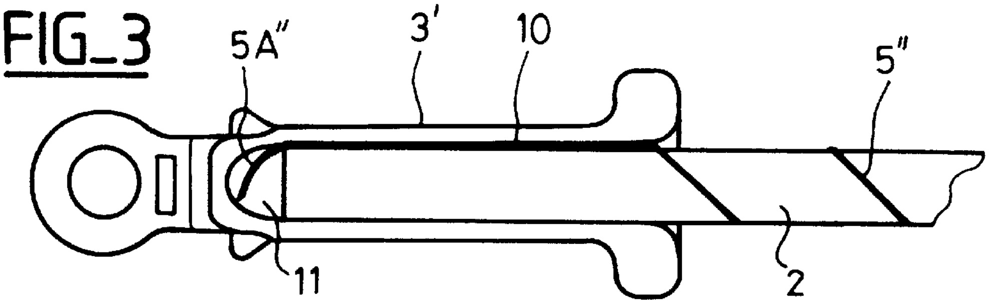
FIG. 3 shows the disposition of the optical fiber including a Bragg grating and placed in the composite insulator of the invention to measure stresses of thermal origin.

In FIG. 3, an optical fiber 5" serves as an integrated sensor for measuring stresses of thermal origin acting more particularly on the end-fitting 3' situated at the medium or high voltage end of the insulator. The portion 5A" that is stripped down to the optical cladding of the fiber 5" in which a Bragg grating is written, in this case the end portion of the optical fiber disposed inside the insulator, is put into close contact with the end-fitting 3', e.g. in an inside groove 10 within the end-fitting 3', or else it is left free inside an internal cavity 11 formed inside the end-fitting 3', beyond the support rod 2. The cavity 11 is preferably filled with a gel that is a good conductor of heat. Using this disposition, the Bragg grating in the optical fiber 5" is sensitive to the temperature variations to which the end-fitting 3' is subject, but it is insensitive to mechanical deformations of the support rod 2. The remainder of the optical fiber 5" is placed helically around the support rod 2 and it extends to outside the insulator via the end-fitting 3 for connection to a measurement unit 6 that includes a source 7 and an analyzer 8 as mentioned above. This insulator with its integrated sensor for measuring stresses of thermal origin acting on the metal end-fitting of the insulator that is situated at the medium or high voltage end of the insulator can be used not only as a line insulator but also as a functional member in a system for managing the transport capacity of a line in an electricity grid, since the sensor integrated in the insulator can make it possible to determine the capacity of the line to support any increase in the electricity being carried on the basis of the temperature measured by the integrated sensor.

It will be understood that the sensor 5A" for sensing stresses of thermal origin having a Bragg grating and the sensor 5A' for sensing stresses of mechanical origin having one or two Bragg gratings, can both be implanted in the same optical fiber.

The invention applies to a composite insulator having a support rod 2 that is solid or hollow. In addition, a composite insulator of the invention can be provided with a plurality of optical fibers such as 5, 5', 5" constituting integrated sensors connected to one or more measurement units 6.

What is claimed is:

1. A composite electrical insulator, including a support rod and an integrated optical fiber sensor placed inside the insulator in close contact with said support rod wherein said integrated sensor is a fault sensor comprising an optical fiber having optical cladding that melts at a temperature which is critical for the insulator with respect to a fault condition, said optical fiber having transmission characteristics indicative of whether the cladding is melted.

2. An insulator according to claim 1, in which the optical cladding of the optical fiber is made of a hard polymer.

3. A composite electrical insulator according to claim 1, wherein said optical fiber has one end placed inside the insulator which is treated to act in reflection and the other end guided outside the insulator which is connected to a measurement unit.

4. A composite electrical insulator, including a support rod having a longitudinal axis and an integrated optical fiber sensor placed inside the insulator for measuring stresses of mechanical or thermal origin, wherein said integrated sensor is comprised of an optical fiber in which a first and a second Bragg grating are implanted, said first Bragg grating being implanted in a first portion of said optical fiber in close contact with said support rod and extending along said longitudinal axis of said support rod to be sensitive to any stresses of mechanical or thermal origin of said support rod, said second Bragg grating being implanted in a second portion of said optical fiber close to said first portion so as to be sensitive to same stresses of thermal origin as the first Bragg grating but without being subject to any deformation of said support rod.

5. A composite electrical insulator according to claim 4, wherein said optical fiber has one end placed inside the insulator which is treated to act in reflection and the other end guided outside the insulator which is connected to a measurement unit.

6. A composite electrical insulator, including a support rod having two ends inserted in two respective hollow metal end-fittings and an integrated fiber sensor placed inside the insulator for measuring stresses of thermal origin, wherein said integrated sensor is comprised of an optical fiber in which a Bragg grating is implanted, said Bragg grating being implanted in an end portion of the optical fiber which is left free in a cavity formed inside one of said two metal end-fittings, said cavity being filled with a gel that is a conductor of heat.

7. A composite electrical insulator according to 6, wherein said optical fiber has one end placed inside the insulator which is treated to act in reflection and the other end guided outside the insulator which is connected to a measurement unit.

* * * * *

UNITED STATES PATENT AND TRADEMARK OFFICE

CERTIFICATE OF CORRECTION

PATENT NO. : 6,635,828 B2 
DATED : October 21, 2003
INVENTOR(S) : Lepley et al.

It is certified that error appears in the above-identified patent and that said Letters Patent is hereby corrected as shown below:

Column 6,
Line 19, before “6”, -- claim -- should be inserted.

Signed and Sealed this

Eleventh Day of May, 2004

JON W. DUDAS
*Acting Director of the United States Patent and Trademark Office*